May 12, 1959 G. G. SPRATT 2,886,368
WEAPON RELEASE MECHANISM
Filed June 26, 1956 2 Sheets-Sheet 1

INVENTOR.
GEORGE G. SPRATT
BY
ATTORNEYS

May 12, 1959

G. G. SPRATT 2,886,368

WEAPON RELEASE MECHANISM

Filed June 26, 1956

INVENTOR.
GEORGE G. SPRATT
BY
H. H. Beanigan
ATTORNEYS

United States Patent Office 2,886,368
Patented May 12, 1959

2,886,368
WEAPON RELEASE MECHANISM

George G. Spratt, West Chester, Pa., assignor, by mesne assignments, to the United States of America as represented by the Secretary of the Navy Application June 26, 1956, Serial No. 594,068

1 Claim. (Cl. 294—83)

This invention relates to release mechanisms. It has a special adaptation for aircraft release means such as helicopters or fixed wing aircraft, but can be used also on other types of mechanisms or systems where a lowering of a load is involved.

An object of this invention is to provide a mechanical device which has a relatively few moveable parts and thus is easily maintained, assembled and manufactured.

A further object of this invention is to provide a release mechanism which insures release of the load regardless of cable slack in the system.

A still further object of this invention is to provide a release mechanism which can be used when it is moving forward at high speeds relative to the ground or when the mechanism or housing is relatively fixed to the release point on the ground.

These and other objects will be readily apparent to those skilled in the art from an examination of the following description and an examination of the drawing wherein.

Figure 1:
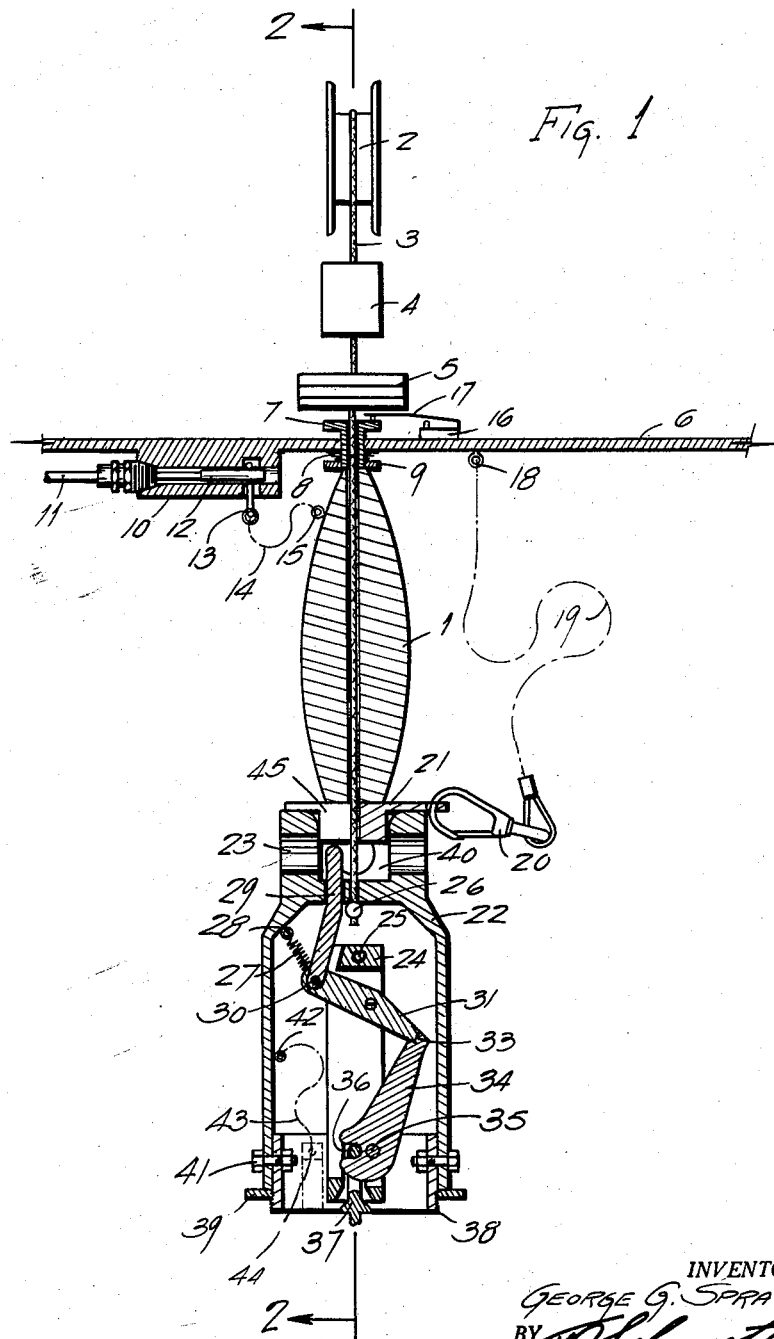
Figure 1 is a cross-sectional view along section line 1—1 of Figure 2.
Figure 2:
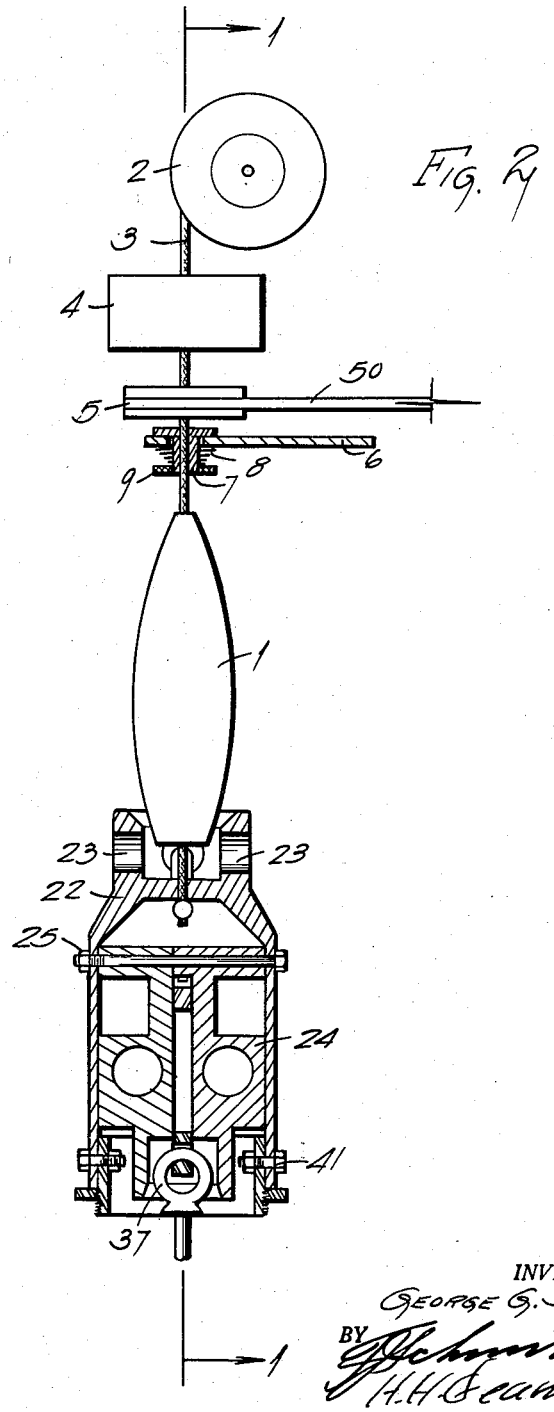
Figure 2 is a cross-sectional view along section lines 2—2 of Figure 1.

In the following discussion reference will be made to the use of the mechanism on a plane such as a helicopter; it being understood however, that the release mechanism may be used on fixed wing aircraft and in permanent ground installations.

In the figures, a cable 3 is wound around drum 2 which is fixed to the aircraft structure. One end of the cable (not shown) leads back to the main drum or reeving system and is in a sense the source of cable supply for lowering and raising the release mechanism and load. The other end of the cable passes through a conventional counter 4 which determines the length of cable passed through. The cable also passes through a cutter 5; the details of the cutter are conventional and form no part of the present invention.

The cable continues through a bushing 7, weight 1, safety cover 21 and is prevented from being retracted by the globular terminal 26 in the housing 22.

Bushing 7 is slideable in the aircraft frame structure 6 and is prevented from passing through its associated port by a flange on one end and a screwed flange or nut 9 on the opposite end. A spring 8 is placed between the adjustable flange and the structure 6 permitting a resistive up-and-down motion of the bushing. The bushing serves to guide the cable to and from the drum and also acts to trigger micro-switch 16 which stops the cable drum from winding the load release assembly beyond a predetermined length by mechanism not shown.

The cable terminal 26 suspends the release housing 22 in which is maintained the release mechanism. The upper section of the housing has a longitudinal groove 40 to accommodate the entrance of the weight 1. Ports 23, formed in the side walls of the housing, lead into the groove which ports act to retard the velocity and to dampen the force of the traveler weight 1.

Blocks 24 are secured in the lower portion of the housing and provide a passageway for the tripping mechanism therebetween. Release pin 29 of the tripping mechanism extends into both the lower and upper sections; one end of which is located to be struck by the traveler weight, the other end is pivoted to one end of lever 31 pivoted at 32 at the approximate midpoint thereof. Lever 31 and pin 29 are restrained from movement by spring 27 fastened to the eye bolt 28 in the housing and to the lever 31. The opposite terminal of lever 31 is squared off and is engaged by a cut-out section 33 in rocking lever 34, the latter element being pivoted at 35. The lower portion of lever 34 is hooked to engage the ring 37 of the load. With the load suspended, the action of the lever 34 is to maintain contact between the squared section of lever 31 and the cut-out section thereby preventing inadvertent release of the load.

The lower section of the housing comprises a sleeve 38 secured by bolt means 41 to such lower section. The outer wall of the sleeve 38 is threaded thereby accommodating a nut 39 which secures the sleeve to the housing.

Clip 42 fastened to the wall of the housing retains one end of a lanyard 43; the other end of which is attached to a clip 44 which is secured to the arming pin in the load.

A release means 10 has a longitudinal groove therein which permits reciprocal movement of the actuator rod 12. Means 11 lead back to the operator's position and when actuated reciprocate rod 12 along its groove. A cut-out section in the release means allows a ring 13 to be slipped over the rod. The ring is attached to one terminal of a lanyard 14; the other end of which is secured by clip and bolt means 15 to the traveler weight. Although means 10 are shown to be mechanical, they can be replaced by electro-mechanical means such as a solenoid means and still remain within the scope of the invention.

The safety cover 21 has a radial cut-out 45 allowing the cover to be pulled free of the cable 3. The cover is attached to the aircraft structure by means of clip 20, lanyard 19 and terminal 18.

Operation

The load, whatever it may be, is secured by ring 37 in the hook portion 36 of lever 34. The lever is rotated to the position on Figure 1 and locked in that position by lever 31 and release pin 29. The safety cover 21 prevents the traveler weight 1 from engaging the pin and inadvertently tripping the release mechanism. Ring 13 is passed over rod 12 thereby preventing the weight from dropping. The load is then transported to its release point.

At such point when the load is to be jettisoned, the cable 3 is lowered to the desired amount. Lanyard 14 becomes taut preventing the weight from dropping more than such minimum distance from slack to taut of lanyard 14. Further lowering of the cable causes cover 21 to slip away from the cable allowing a clear entry for the traveler weight. Mechanism 11 is actuated from the operator's compartment, retracting rod 12 and thereby freeing ring 13 and lanyard 14. The traveler weight drops forcing the release pin 29 to rotate lever 31 against the bias of spring 27; lever 34 is rotated counter clockwise by the force of the weight attached to ring 37. Being clear of hook section 36 the weight or load attached to ring 37 drops of its own accord at the release point. As the load falls, the arming pin being attached to the housing 22 by means of the lanyard 43, is withdrawn from the load.

If the load and a portion of the cable 3 are resting upon the ground, it may happen that the triggering operation is not actuated even though mechanism 11 is actuated to free ring 13 and lanyard 14. In such cases, the traveler weight 1 would be prevented from traveling the full length of cable 3 to contact the pin 29.

However, upon resumption of flight or winding in of the cable 3 to raise it off the ground, the weight 1 is thereby permitted to continue its travel down the cable 3 to contact the pin 29 thereby actuating the tripping mechanism. The weight of the traveler 3 without any velocity is sufficient to actuate the release pin 29.

In the event of emergencies of any sort, means 50 on the cable cutter are actuated, severing the cable and releasing the load and the entire housing 22.

Obviously many modifications and variations of the present invention are possible in the light of the above teachings. It is therefore to be understood that within the scope of the appended claim the invention may be practiced otherwise than as specifically described.

What is claimed is:

Apparatus for lowering a load on a cable a predetermined distance from support means and controlling release of said load thereafter said apparatus comprising a housing secured to one end of the cable; means for varying the length of the cable between the support means and the housing; a weighted body mounted for guided slideable movement on the cable between the support means and the housing; means for initially restraining the slideable movement of the weighted body on the cable; a release mechanism engaging said restraining means and operative to allow the weighted body to gravitate freely on the cable toward the housing; a latching lever pivoted within the housing; an actuating pin disposed for engagement with the weighted body when said weighted body approaches a position on the cable adjacent the housing, said actuating pin being pivotally connected to said latching lever adjacent one end thereof; a load carrying lever notched for engagement with the other end of the latching lever; bias means for normally maintaining engagement of the latching lever with the load carrying lever; said actuating pin being effective upon engagement with said weighted body to overcome the bias means and enable disengagement of said latching lever from said load carrying lever whereupon said load carrying lever releases a load carried thereby; a safety device disposed between the weighted body and the actuating pin for preventing contact therebetween; and means for disengaging the safety device when the housing is lowered on the cable a predetermined distance from the support means.

References Cited in the file of this patent

UNITED STATES PATENTS

| | | |
|---|---|---|
| 1,198,139 | Lyon | Sept. 12, 1916 |
| 1,299,440 | Elia | Apr. 8, 1919 |
| 1,893,232 | Halsey | Aug. 7, 1925 |
| 1,902,391 | Wulf | Mar. 21, 1933 |
| 2,336,812 | Spencer | Dec. 14, 1943 |
| 2,730,398 | Huested | Jan. 10, 1956 |
| 2,732,246 | Bernhart | June 24, 1956 |